April 12, 1927.

L. FERRARA 1,624,400

SANDPAPER AND RUBBING MACHINE

Filed Dec. 11, 1925   2 Sheets-Sheet 1

INVENTOR.
Louis Ferrara
BY
ATTORNEY

April 12, 1927.　　　　　L. FERRARA　　　　　1,624,400
SANDPAPER AND RUBBING MACHINE
Filed Dec. 11, 1925　　2 Sheets-Sheet 2
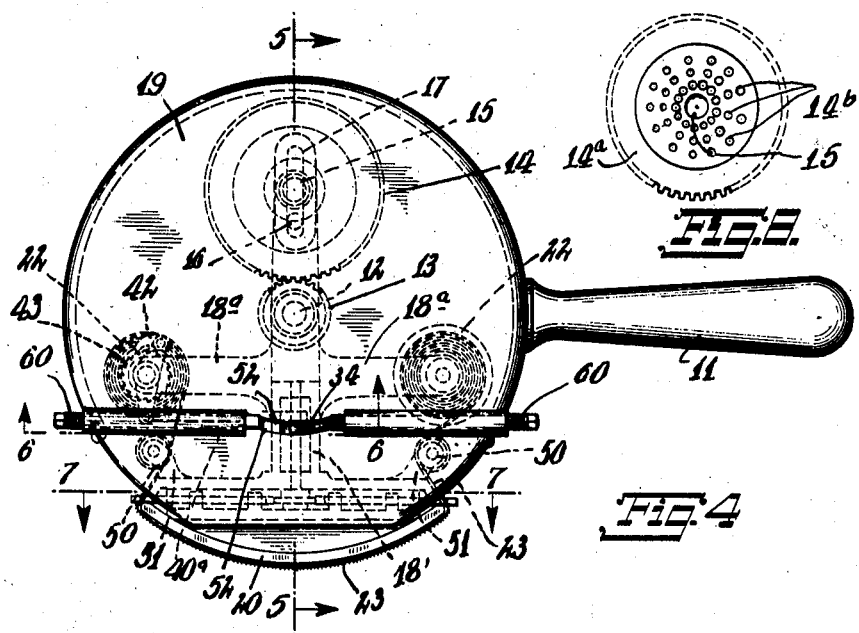
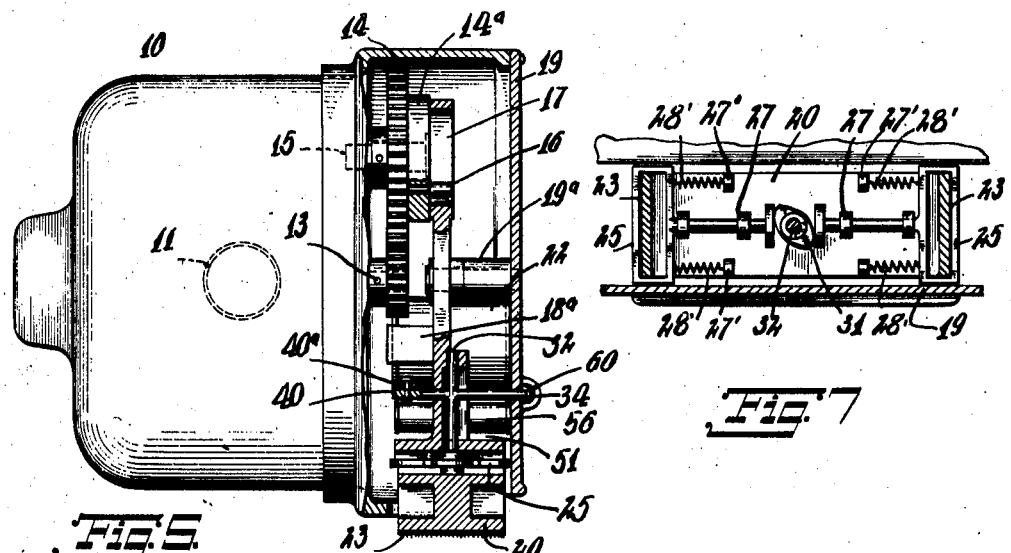
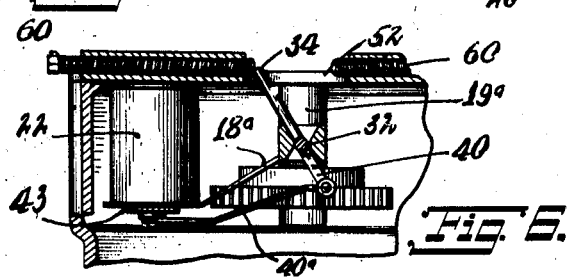
INVENTOR.
Louis Ferrara
BY 
ATTORNEY Patented Apr. 12, 1927.

1,624,400

UNITED STATES PATENT OFFICE.

LOUIS FERRARA, OF BROOKLYN, NEW YORK.

SANDPAPER AND RUBBING MACHINE.

Application filed December 11, 1925. Serial No. 74,712.

This invention relates to improvements in machines for use in sandpapering floors, automobile bodies, cabinet walls, or other surfaces, the invention having for an object the provision of a novel means of a machine of this sort which is readily manipulable by hand and in which the active operative element is adjustable and in the form of a reciprocable device, and said reciprocable device being pivoted in the central portion of the casing.

For further comprehension of the invention, and of the objects and advantages thereof, reference will be had to the following description and accompanying drawings, and to the appended claims in which the various novel features of the invention are more particularly set forth.

Fig. 1 of the drawings, shows a side elevation of my improved device.

Fig. 4 shows a side elevational view of a slightly modified form of my invention.

Fig. 5 shows a side view of Figure 4, partly sectional taken on the line 5—5 of said Figure 4.

Fig. 6 shows a fragmentary tranverse sectional view taken on the line 6—6 of Figure 4.

Fig. 7 shows a fragmentary transverse sectional view taken on the line 7—7 of Figure 4.

Fig. 8 shows a face view of part 14ª.

Figure 1:
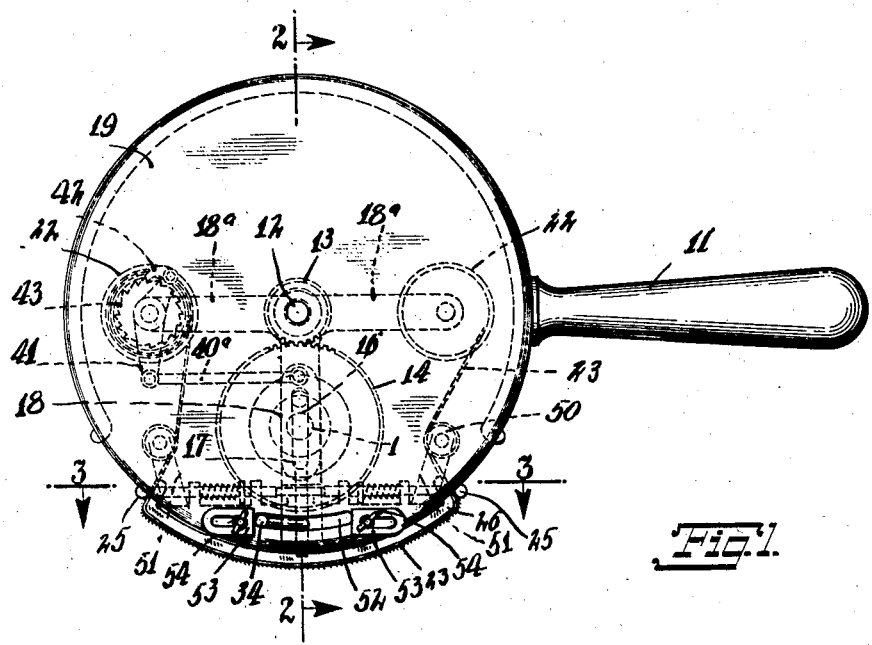
Figures 2, 3:
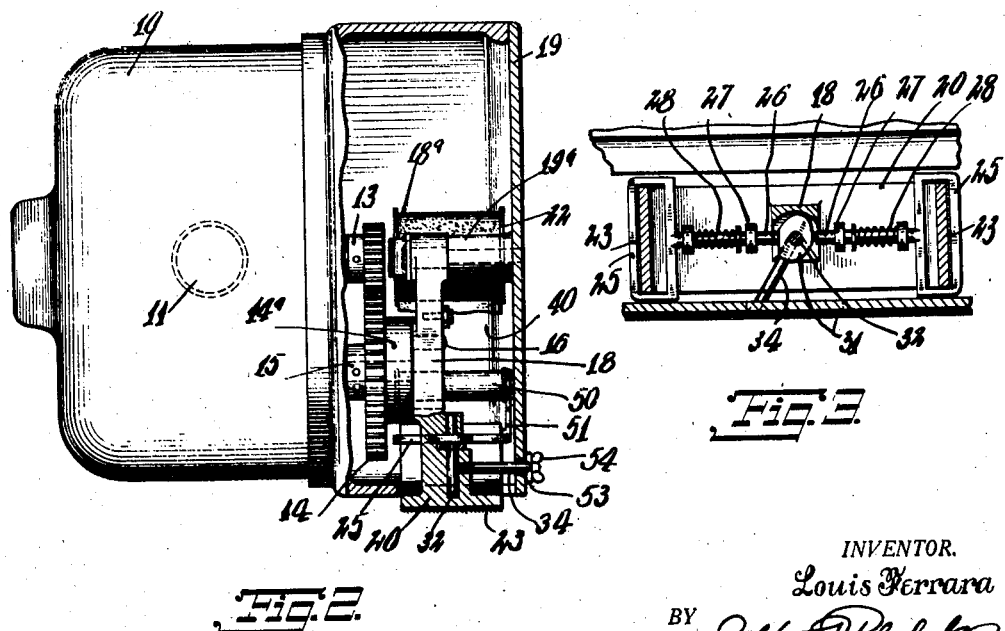
Fig. 2 shows a side view thereof, partly sectional taken on the line 2—2 of Figure 1.
Fig. 3 shows a transverse, fragmentary sectional view taken on the line 3—3 of Figure 1.

In the drawing the reference numeral 10 indicates a small electric motor of ordinary type to the casing of which a projecting handle 11 is attached. Upon one end of the shaft 12 of the motor a gear pinion 13 is fixed, this pinion meshing with a gear 14 loose on a stub shaft 15 fixed in the motor casing. The face of the gear 14 is provided with a projecting portion 14ª having a series of apertures 14ᵇ each differently positioned relative to the shaft 15, and a pin 16 is adapted to be forced into any of said apertures, thereby providing an adjustable eccentricity for said pin, which engages in a longitudinal slot 17 in an oscillatory lever 18 that is fulcrumed to a projection 19ª from the center of casing cover 19.

Upon the lower end of the lever 18 is fixed a foot 20 of rectangular shape in plan view and whose lower surface is curved concentric with the fulcrum point of the lever. Said lever 18 is provided with lever extension arms 18ª having revolvably supported at the extremities drums 22 over which are passed the ends of a web 23 of sand paper, the web of paper passing under the foot from one drum to the other and bearing against idler drums 50 revolvably supported by brackets 51 carried by said foot 20. The paper is locked to the foot by means of the clamping bars 25 that project across the ends of the foot and are fixed to the ends of the bars 26 slidable in bearing elements 27 on the foot, springs 28 acting to keep the clamping bars in operative position. The inner ends of the bars 26 bear against a cam 31 that is fixed on the rod 32 that extends along lever 18 and is pivotally mounted thereon. This rod 32 has fixed thereto a laterally projecting pin 34 that is adapted to engage in a slot 52 of cover plate 19, and length of said slot may be varied by shifting slot plates 53 slidably mounted to cover plate 19 and fixed in position by wing screws 54, whereby when the lever reaches the end of its oscillatory movement, the rod 32 is rocked by pin 34 striking edge of adjusted slot 52, and so momentarily frees the clamping bars from the paper to permit of the latter being advanced. Fixed to the rod 32 at the upper portion is an arm 40 connected to further extension 40ª, and engaging one end of the lever 41 pivoted to one of said drums 22 and other end operating a ratchet 42 that bears against ratchet wheel 43 fixed co-axially to the latter said drum 22. The pin 34 and arm 40 are so positioned with respect to one another and the action of cam 31 that the clamping bars 25 will be lifted from the paper before the thrust moves the drum and advances the paper, the bars 25 again engaging the paper after the said movement of the drum has been completed.

The modified form of my invention shows a slightly different construction and arrangement of parts. The casing cover 19 similarly has a central projection 19ª, but the gear 14 is situated on the vertical center line above the shaft 12, necessitating the use of a different oscillating lever 18' having the actuating slot 17 on the upper end. Instead of two springs 28, four springs 28' are used acting together with standards 27' fixed to foot 20. The adjustment of the length of slot 52 is controlled by adjusting screws 60 acting through tapped holes in cover 19.

The operation and use of my machine will be readily understood from the above description, it being apparent that rotation of the motor shaft will cause the foot 20 to oscillate and the paper to be gradually fed forward. The pin 34 in the bar 18 striking the right hand side of slot 52 turns said bar 18 to the left causing the ratchet wheel to advance the sandpaper, and as previously explained also causes with correct turning to release 25, while when said pin strikes the left-hand side of slot 52 it causes bar 18 to turn to the right thereby idling pawl backward on ratchet wheel, but not turning the wheel therefore not moving the sandpaper even though clamping bars releases paper as before explained.

While I have above described the preferred form, construction and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new, and desire to protect by Letters Patent of the United States is as follows:—

1. A sandpapering machine comprising an electric motor, a casing for said motor, a lever fulcrumed on the motor casing at the central part thereof, means within the casing forming an operative connection between the motor shaft and the lever to oscillate the lever, a sandpaper holding foot rigidly mounted on said lever, a pair of drums supported by said lever, a strip of sandpaper extending from said drums across the face of said holding foot, means for clamping said sandpaper, and means for releasing said clamping means and advancing said sandpaper.

2. A sandpapering machine comprising an electric motor, a casing for said motor, a lever fulcrumed on the motor casing at the central part thereof, means within the casing forming an operative connection between the motor shaft and the lever to oscillate the lever, said means comprising an elongated slot in the lever, a train of gears connected with said motor shaft, one gear of said train being formed with a projecting portion having a series of apertures each differently positioned relative to the center of rotation of said gear, and a pin engaged in one of said apertures, said pin projecting into said elongated slot, a sandpaper holding foot rigidly mounted on said lever, a pair of drums supported by said lever, a strip of sandpaper extending from said drums across the face of said holding foot, means for clamping said sandpaper, and means for releasing said clamping means and advancing said sandpaper.

3. A sandpapering machine comprising an electric motor, a casing for said motor, a lever fulcrumed on the motor casing at the central part thereof, means within the casing forming an operative connection between the motor shaft and the lever to oscillate the lever, said means comprising an elongated slot in the lever, a train of gears connected with said motor shaft, one gear of said train being formed with a projecting portion having a series of apertures each differently positioned relative to the center of rotation of said gear, and a pin engaged in one of said apertures, said pin projecting into said elongated slot, a sandpaper holding foot rigidly mounted on said lever, a pair of drums supported by said lever, a strip of sandpaper extending from said drums across the face of said holding foot, means for clamping said sandpaper, an arcuate slot in said casing, adjustable means at each end of the arcuate slot for the effective length of said arcuate slot, and means for momentarily freeing and advancing the sandpaper, controlled by a member striking the adjustable means at the ends of said arcuate slot.

In testimony whereof I have affixed my signature.

LOUIS FERRARA.